US012526562B2

(12) United States Patent
Kusui et al.

(10) Patent No.: US 12,526,562 B2
(45) Date of Patent: Jan. 13, 2026

(54) ELECTRONIC EQUIPMENT

(71) Applicant: Sony Interactive Entertainment Inc., Tokyo (JP)

(72) Inventors: Ryo Kusui, Tokyo (JP); Ryu Sannomiya, Tokyo (JP); Yu Aoki, Tokyo (JP); Takeshi Igarashi, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 249 days.

(21) Appl. No.: 17/999,594

(22) PCT Filed: Jun. 4, 2021

(86) PCT No.: PCT/JP2021/021430
§ 371 (c)(1),
(2) Date: Nov. 22, 2022

(87) PCT Pub. No.: WO2021/251304
PCT Pub. Date: Dec. 16, 2021

(65) Prior Publication Data
US 2023/0199355 A1 Jun. 22, 2023

(30) Foreign Application Priority Data
Jun. 8, 2020 (JP) ................................. 2020-099504

(51) Int. Cl.
*H04R 1/02* (2006.01)
*A63F 13/25* (2014.01)
(Continued)

(52) U.S. Cl.
CPC ............. *H04R 1/025* (2013.01); *A63F 13/25* (2014.09); *H04R 1/288* (2013.01); *H04R 1/04* (2013.01); *H04R 2499/11* (2013.01)

(58) Field of Classification Search
CPC .......... H04R 1/025; H04R 1/288; H04R 1/04; H04R 2499/11; A63F 13/25
See application file for complete search history.

(56) References Cited

U.S. PATENT DOCUMENTS 11,839,808 B2 12/2023 Morita
2011/0077063 A1 3/2011 Yabe
(Continued)

FOREIGN PATENT DOCUMENTS

CN 103621050 A 3/2014
CN 107613069 A * 1/2018
(Continued)

OTHER PUBLICATIONS

English translation of JP2011029841A, accessed Sep. 26, 2024 via Espacenet; <https://translationportal.epo.org/emtp/translate/?ACTION=description-retrieval&COUNTRY=JP&ENGINE=google&FORMAT=docdb&KIND=A&LOCALE=en_EP&NUMBER=2011029841&SRCLANG=ja&TRGLANG=en> (Year: 2011).*
(Continued)

*Primary Examiner* — Jeremy A Luks
(74) *Attorney, Agent, or Firm* — Fish & Richardson P.C.

(57) ABSTRACT

Provided is electronic equipment capable of suppressing a change in sound quality output from a speaker. An operating device (10) (electronic equipment) has a speaker (2) with a terminal section P, a frame (50) (storage member), and an elastic member (3). The frame (50) has a wall section (52) that defines at least part of a storage chamber A that stores the speaker (2). An opening (53) from which the sounds from the speaker (2) are output is formed in the wall section (52). The elastic member (3) supports a lower surface of the speaker (2), is arranged at a position avoiding the terminal section P of the speaker (2), and presses the speaker (2) against an edge (54) of the opening (53).

17 Claims, 4 Drawing Sheets

(51) Int. Cl.

| | |
|---|---|
| ***H04R 1/04*** | (2006.01) |
| ***H04R 1/28*** | (2006.01) |

(56) References Cited

U.S. PATENT DOCUMENTS

| | | | |
|---|---|---|---|
| 2011/0110547 | A1 | 5/2011 | Oishi |
| 2022/0016520 | A1 | 1/2022 | Morita |

FOREIGN PATENT DOCUMENTS

| | | | | |
|---|---|---|---|---|
| CN | 207947899 | U | | 10/2018 |
| EP | 2528355 | A2 | | 11/2012 |
| JP | 04023251 | A | | 4/1992 |
| JP | 0582191 | A | | 11/1993 |
| JP | 2004120598 | A | | 4/2004 |
| JP | 2006005616 | A | | 1/2006 |
| JP | 2008135961 | A | | 6/2008 |
| JP | 2008294652 | A | | 12/2008 |
| JP | 2010041678 | A | | 2/2010 |
| JP | 2011029841 | A | | 2/2011 |
| JP | 2011071876 | A | | 4/2011 |
| JP | 2012161099 | A1 | | 11/2012 |
| JP | 2016106297 | A | | 6/2016 |
| KR | 20190076658 | A | * | 7/2019 |
| WO | 2020110350 | A1 | | 6/2020 |

OTHER PUBLICATIONS

English translation of JP2004120598A, accessed Sep. 26, 2024 via Espacenet; <https://translationportal.epo.org/emtp/translate/?ACTION=description-retrieval&COUNTRY=JP&ENGINE=google&FORMAT=docdb&KIND=A&LOCALE=en_EP&NUMBER=2004120598&SRCLANG=ja&TRGLANG=en> (Year: 2004).*

International Search Report for corresponding PCT Application No. PCT/JP2021/021430, 5 pages, Sep. 7, 2021.

Extended European Search Report for corresponding EP Application No. 21822128.1, 8 pages, Jun. 13, 2024.

Notice of Reasons for Refusal for corresponding JP Application No. 2022-530537, 8 pages, Jan. 16, 2024.

Notice of Reasons for Refusal for corresponding JP Application No. 2022-530537, 8 pages, Jun. 26, 2024.

The First Office Action for corresponding application No. CN202180028655.8, 19 pages, dated Dec. 28, 2024.

* cited by examiner

ELECTRONIC EQUIPMENT

TECHNICAL FIELD

The present invention relates to electronic equipment.

BACKGROUND ART

An operating device for inputting a user instruction to a gaming console is disclosed in PTL 1 listed below. The operating device has held sections to be held by a user on left and right thereof and a center section between the left and right held sections. A speaker is built into the center section, and an opening (sound hole in PTL 1 listed below) is formed at a position corresponding to that of the speaker in the center section.

CITATION LIST

Patent Literature

[PTL 1] Japanese Patent Laid-Open No. 2016-106297

SUMMARY

Technical Problem

In order to acquire an excellent sound quality, it is desirable that a capacity of a storage chamber in which the speaker is arranged be maintained at a preset size. Accordingly, it is preferred that the speaker be in close contact with an edge of the opening in such a manner as to block the opening.

It is an object of the present invention to provide electronic equipment capable of suppressing a change in sound quality output from the speaker.

Solution to Problem

Electronic equipment according to the present invention has a speaker, a storage member, an opening, and an elastic member. The speaker has a first surface that faces a first direction, a second surface that faces a direction opposite to the first direction, and a terminal section. The storage member has a wall section that defines at least part of the storage chamber that stores the speaker. The opening is formed in the wall section, is located in the first direction relative to the first surface of the speaker, and is used to output sounds from the speaker. The elastic member supports the second surface of the speaker, is arranged at a position avoiding the terminal section of the speaker, and presses the speaker against an edge of the opening. According to the present invention, it is possible to suppress a change in sound quality output from the speaker.

DESCRIPTION OF EMBODIMENT

Figure 1:
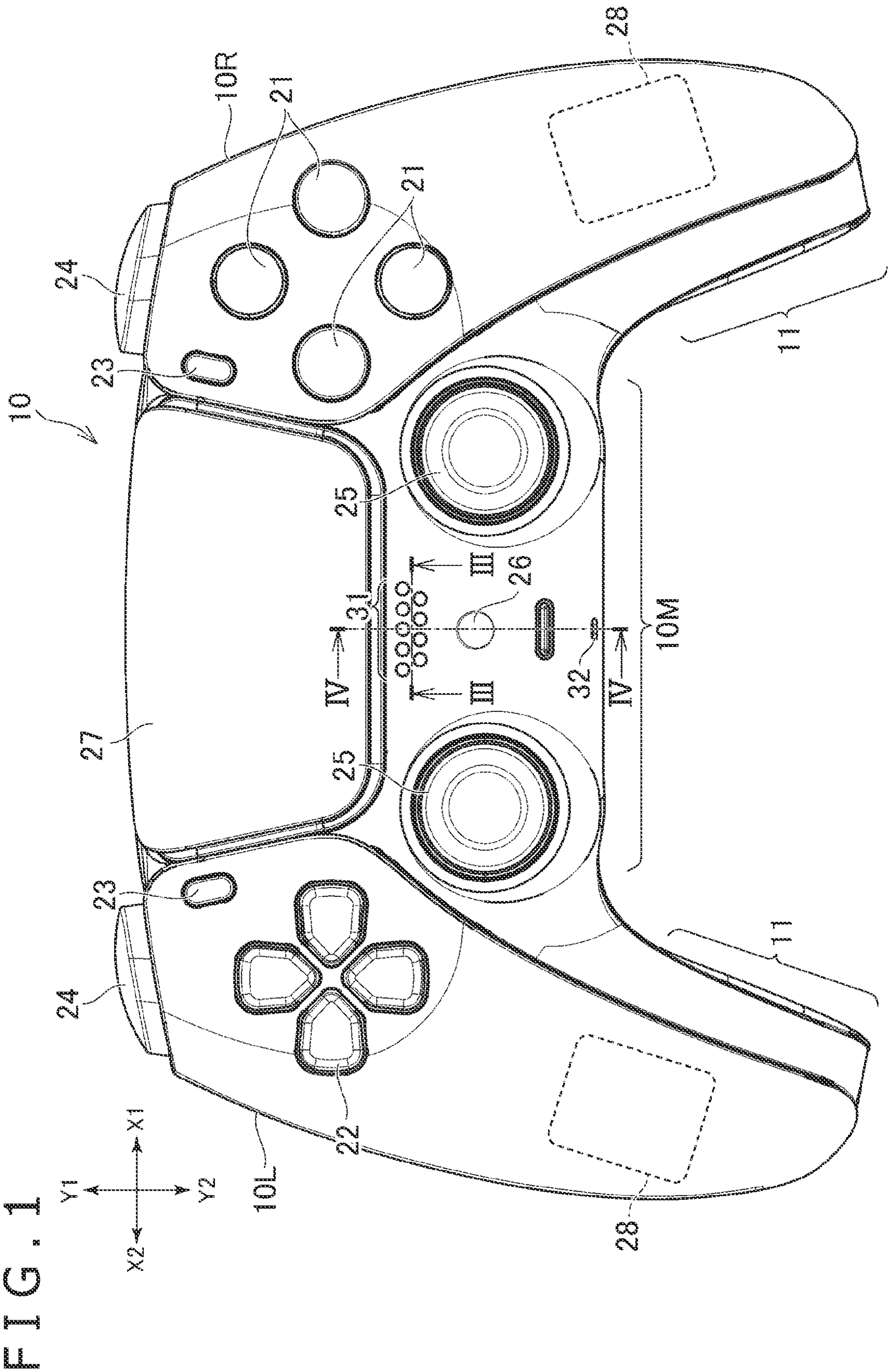
FIG. 1 is a plan view illustrating an operating device according to an example of an embodiment of the present invention.
Figure 2:
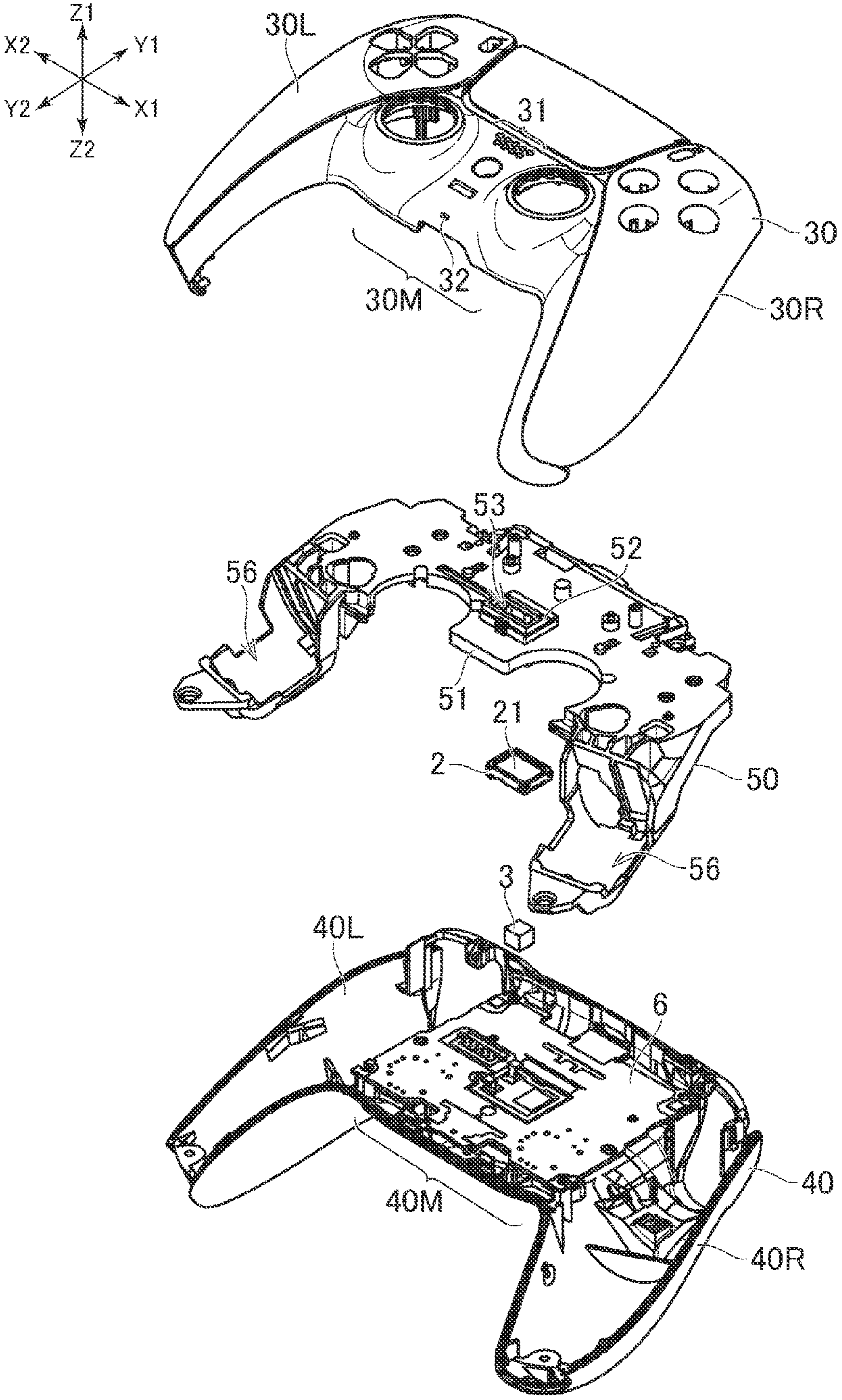
FIG. 2 is an exploded perspective view of the operating device.

A description will be given below of an embodiment of the present disclosure with reference to drawings. An operating device 10 as an example of the embodiment is illustrated FIG. 1 and the like. In the description given below, X1 and X2 illustrated in FIG. 1 are a rightward direction and a leftward direction, respectively, and Y1 and Y2 are a forward direction and a backward direction, respectively. Also, Z1 and Z2 illustrated in FIG. 2 are an upward direction and a downward direction, respectively. It should be noted, however, that these directions and arrangement positions are defined to describe shapes of and relative positional relations between elements (components, members, and sections) of the operating device 10 and do not restrict a posture of the operating device 10.

FIG. 1 illustrates the operating device 10 (electronic equipment) as an example of the embodiment. The operating device 10 is used as an input device for an information processing apparatus having a game program execution function, a video reproduction function, a communication function through the Internet, and the like. The operating device 10 is capable of communicating, in a wired or wireless manner, with the information processing apparatus and sends, to the information processing apparatus, signals that match operations performed on the operating device 10 by a user. The operating device 10 incorporates various sensors (e.g., acceleration sensor, gyrosensor) that are used to detect the posture and motion of the operating device 10, a battery, a mechanism that supplies feedbacks to the user by means of vibrations, sounds, light, and by other means, and the like.

As will be described later, the operating device 10 has a speaker 2 (refer to FIG. 2) that outputs sounds and a first microphone 8A and a second microphone 8B (refer to FIG. 4) for acquiring user's spoken voice. Voice data acquired through the microphones 8A and 8B is sent to the information processing apparatus and provided to a voice recognition process or used for voice chat (voice call) with another user. Voice data of the other user is output from a speaker connected to the information processing apparatus or from the speaker 2 built into the operating device 10. Voice data acquired through the microphones 8A and 8B may be sent to the information processing apparatus after being subjected to a noise process, an echo process, and the like in the operating device 10.

[Input Members]

As illustrated in FIG. 1, the operating device 10 has, on its left and right portions, a left held section 10L and a right held section 10R to be held by the user with hands. The left held section 10L and the right held section 10R are spaced apart horizontally, and a device center section 10M is formed between front portions of the held sections 10L and 10R. The held sections 10L and 10R may have grips 11 that extend more backward than a back edge of the device center section 10M. A size of the device center section 10M in the longitudinal direction may be the same as that of the held sections 10L and 10R. In this case, the held sections 10L and 10R may not have the grips 11 that extend backward.

As illustrated in FIG. 1, a plurality of input members to be operated by the user with fingers are provided on upper surfaces of the front portions of the held sections 10L and 10R. Specifically, a plurality of input buttons 21 are provided on the upper surface of the right held section 10R. For example, the four input buttons 21 are arranged at end portions of a cross. Also, cross-shaped direction keys (cross buttons) 22 are arranged on the upper surface of the front portion of the left held section 10L. The direction keys are not limited in shape to a cross and may be circular or rectangular as long as they allow input of directions and amounts of displacement in the longitudinal, horizontal, and diagonal directions. As illustrated in FIG. 1, the operating device 10 may have input buttons 23 on right and left sides of the front portion of a touch panel 27. Further, the held sections 10L and 10R may have input buttons 24 on front surfaces thereof.

As illustrated in FIG. 1, the operating device 10 may have input sticks 25. The input sticks 25 are arranged, for example, on the right and left sides of a back portion of the device center section 10M. The input sticks 25 can be tilted in a radial direction thereof and rotated around a centerline of an initial position in a tilted state. The input sticks 25 may be supported in such a manner as to be able to move up and down and function as buttons. The input sticks 25 may be slidable in the radial directions thereof instead of being tilted in the radial directions. Further, the operating device 10 may have a button 26 that is located at the back of the touch panel 27 and at the horizontal center. The button 26 functions as a power button of the information processing apparatus connected to the operating device 10 and a start button that instructs that wireless connection between the information processing apparatus and the operating device 10 be started.

It should be noted that the positions of the input sticks 25 and the arrangement of the direction keys 22 and the input buttons 21 are not limited to those in the example of the operating device 10. For example, the positions of the right input buttons 21 and the position of the input stick 25 may be interchanged. Also, the positions of the direction keys 22 and the position of the input stick 25 may be interchanged.

As illustrated in FIG. 1, the operating device 10 has the plate-shaped touch panel 27 on the upper surface of the device center section 10M. The touch panel 27 is arranged, for example, in front of the left and right input sticks 25. The touch panel 27 includes a touch sensor. The touch sensor outputs a signal that matches the position of the finger that has touched the upper surface of the touch panel 27. The touch sensor is, for example, a capacitive sensor. The touch panel 27 may be supported in such a manner as to be able to move up and down in response to a pressing-down operation of the user. In the example of the operating device 10, the width of the touch panel 27 in the horizontal direction gradually increases toward the front. This makes it easy for the user to touch the front portion of the touch panel with a thumb while holding the held sections 10L and 10R with hands.

It should be noted that, in the example of the operating device 10, the held sections 10L and 10R of the operating device are horizontally symmetrical to each other. Unlike the example of the operating device 10, these may not be horizontally symmetrical to each other.

[Exterior Members]

FIG. 2 is an exploded perspective view of the operating device 10. As illustrated in FIG. 2, the operating device 10 has an upper cover section 30 and a lower cover section 40 as exterior members of the operating device 10. The exterior members including the upper cover section 30 and the lower cover section 40 not only form an outer surface of the operating device 10 but also store various components (e.g., the speaker 2, the microphones 8A and 8B, a circuit board 6, vibration motors 28, a battery) included in the operating device 10. The upper cover section 30 and the lower cover section 40 may include resin or other material.

The upper cover section 30 has a left section 30L that is included in part of the outer surface of the left held section 10L, a right section 30R that is included in part of the outer surface of the right held section 10R, and a center section 30M that connects the left section 30L and the right section 30R and that is included in part of the outer surface of the device center section 10M. Similarly, the lower cover section 40 has a left section 40L that is included in part of the outer surface of the left held section 10L, a right section 40R that is included in part of the outer surface of the right held section 10R, and a center section 40M that connects the left section 40L and the right section 40R and that is included in part of the outer surface of the device center section 10M. The upper cover section 30 and the lower cover section 40 are fastened to each other. A plurality of sound holes 31 for outputting the sounds from the speaker 2 and a sound hole 32 for conveying external sounds to the microphone 8A are formed in the center section 30M of the upper cover section 30. Also, a sound hole 41 (refer to FIG. 4) for conveying external sounds to the microphone 8A is formed in the center section 40M of the lower cover section 40.

As illustrated in FIG. 2, the operating device 10 has a frame 50. Various components included in the operating device 10 are arranged on the frame 50. The frame 50 has a shape corresponding to an outer shape (outer shapes of the upper cover section 30 and the lower cover section 40) of the operating device 10 and has a plate-shaped center section 51 at the center. The circuit board 6 is fastened to the lower side of the center section 51. The frame 50 is fastened to inner sides of the exterior members that include the upper cover section 30 and the lower cover section 40. Here, the upper cover section 30 covers the upper side of the frame 50, and the lower cover section 40 covers the lower side of the frame 50. The frame 50 may include resin or other material.

[Arrangement of the Speaker]

As illustrated in FIG. 2, the operating device 10 has the speaker 2 that outputs sounds. Voice data sent to the operating device 10 from the information processing apparatus and the like is output from the speaker 2. In the example of the operating device 10, the speaker 2 is in a chip form and has an upper surface (first surface) 2*a* that faces upward (first direction) and a lower surface (second surface) 2*b* that faces downward (direction opposite to the first direction) (refer to FIG. 3). Voice data is output from the upper surface 2*a* of the speaker 2 and output outside the operating device 10 through the plurality of sound holes 31 formed in the upper cover section 30.

Figure 3:
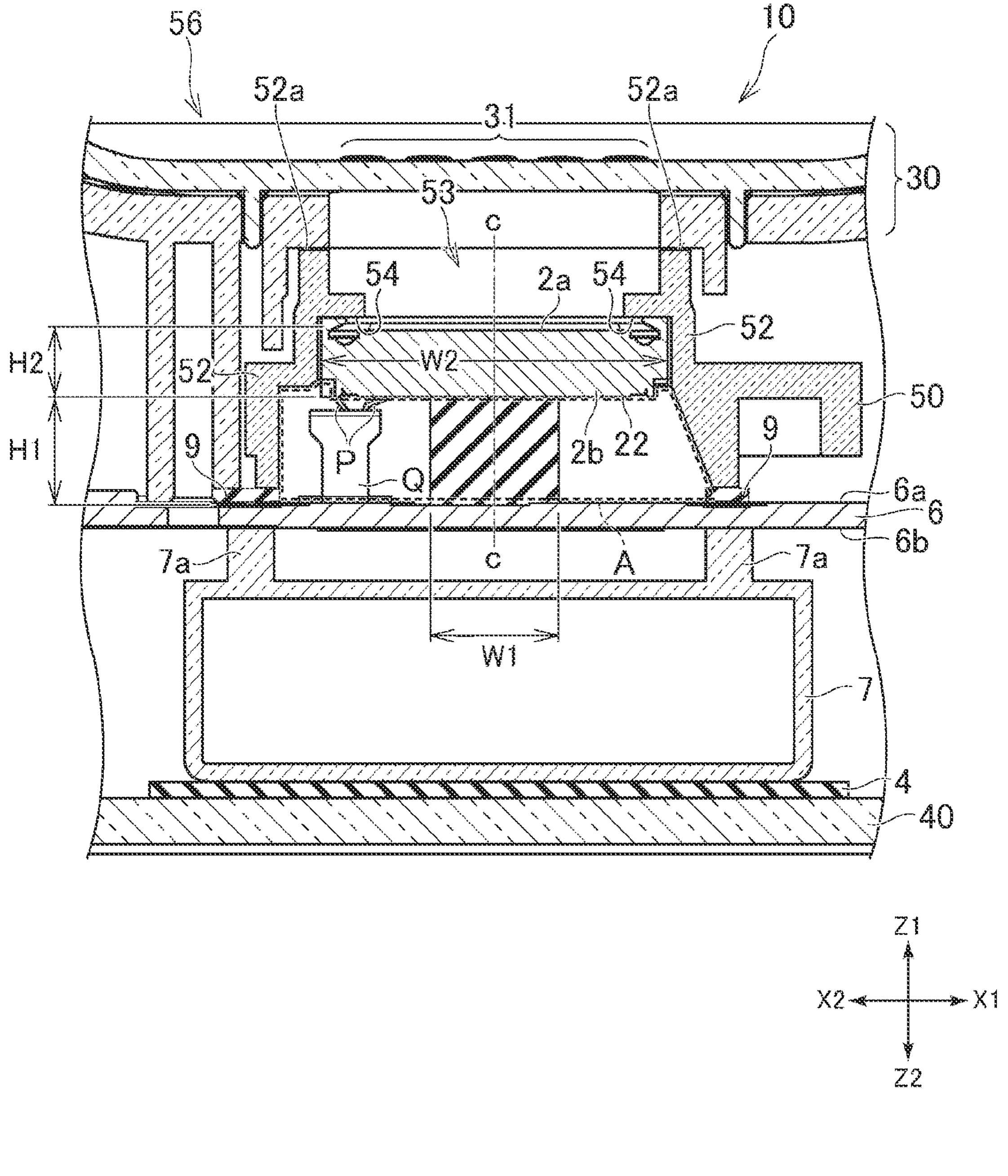
FIG. 3 is a sectional view acquired by a line in FIG. 1.
Figure 4:
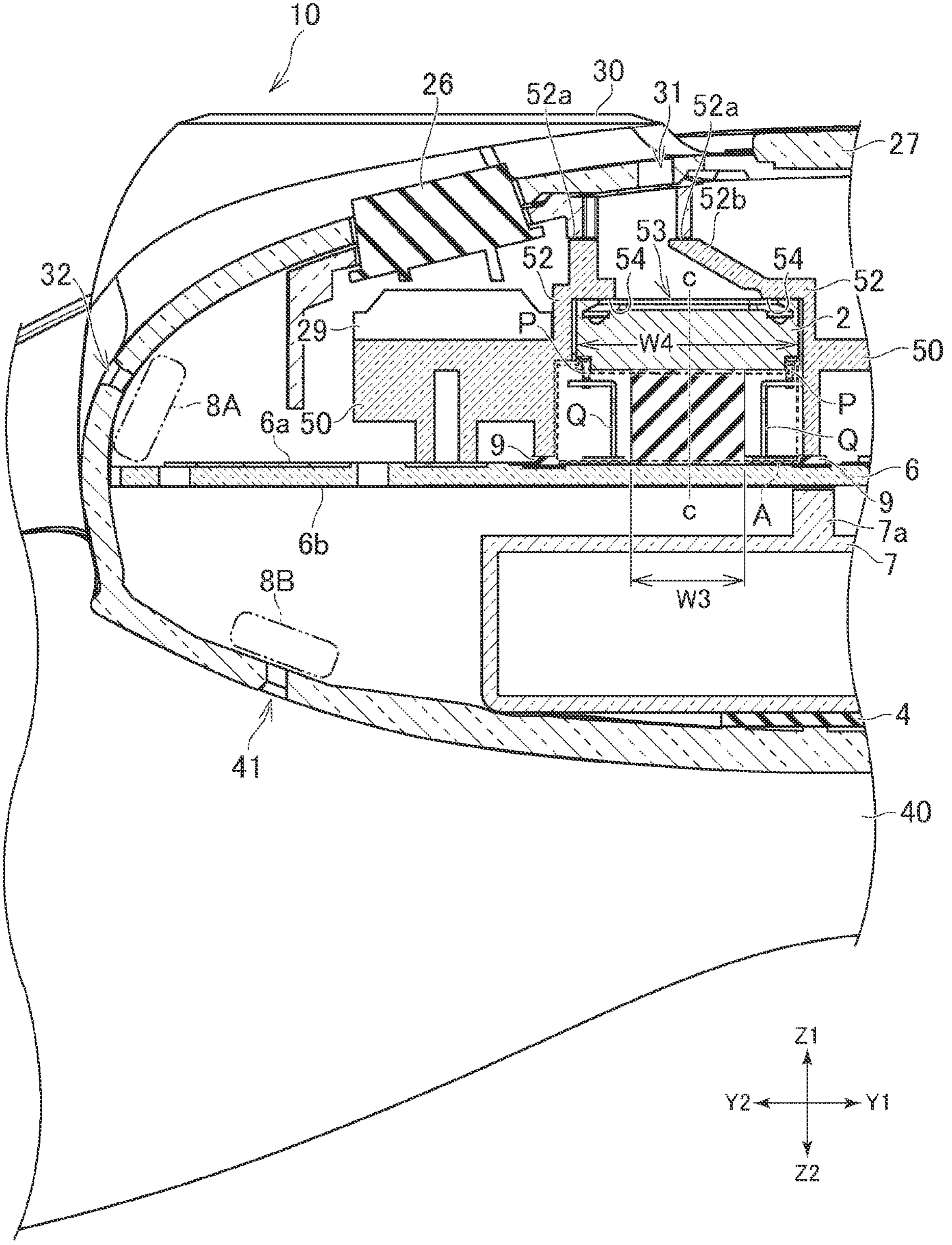
FIG. 4 is a sectional view acquired by a line IV-IV in FIG. 1.

FIG. 3 is a sectional view acquired by a line in FIG. 1, and FIG. 4 is a sectional view acquired by a line IV-IV in FIG. 1. As illustrated in FIGS. 3 and 4, the speaker 2 has a terminal section P for electrical connection with the circuit board 6. The terminal section P is in contact with a terminal section Q that protrudes upward from an upper surface 6*a* of the circuit board 6. Also, the terminal section P is arranged at a position avoiding the center section of the speaker 2. In the example illustrated in FIG. 3, the terminal section P is arranged on a left end portion of the speaker 2.

As illustrated in FIGS. 2 to 4, the operating device 10 has a wall section 52 that defines at least part of a storage chamber A, and the speaker 2 is arranged inside the storage chamber A. In the example of the operating device 10, the frame 50 is a storage member. That is, the frame 50 has the wall section 52 and functions as a storage member that configures at least part of the storage chamber A. In a case where the wall section 52 is formed in the exterior members (e.g., upper cover section 30) of the operating device 10, it is necessary to design the size and shape of the wall section 52 such that no depressions due to shrinkage of the material (e.g., resin) of the exterior member occur. In this regard, it is possible to design the size and shape of the wall section 52 with no regard to depressions that occur on the surface of the exterior members by molding the wall section 52 in the frame 50 which is a member different from the exterior members. As a result, it is possible to improve a degree of freedom in size and shape of the wall section 52.

As illustrated in FIG. 2, the wall section 52 is formed on the center section 51 of the frame 50 and box-shaped to surround the speaker 2 in the longitudinal and horizontal directions. The speaker 2 fits into a box-shaped depression that includes the wall section 52. As illustrated in FIG. 3, a width W2 of the speaker 2 in the horizontal direction and a spacing in the wall section 52 are approximately the same, and as illustrated in FIG. 4, a width W4 of the speaker 2 in the longitudinal direction and the spacing in the wall section 52 are approximately the same. Accordingly, the position of the speaker 2 inside the operating device 10 is determined by the wall section 52.

As illustrated in FIGS. 2 to 4, the wall section 52 is shaped in such a manner as to rise upward relative to the plate-shaped center section 51 of the frame 50, and an opening 53 is formed in an upper end portion 52*a*. The opening 53 is used to output the sounds from the speaker 2, located on an upper side relative to the upper surface 2*a* of the speaker 2, and connected to the plurality of sound holes 31 formed in the upper cover section 30. The upper surface 2*a* from which the sounds of the speaker 2 are output is exposed from the opening 53. An edge of the upper surface 2*a* of the speaker 2 is in contact with an edge 54 of the opening 53, and the two are in close contact with each other.

The storage chamber A in which the speaker 2 is arranged is also referred to as a back chamber, and it is desirable that the storage chamber A be a closed space having a fixed capacity in order to suppress a change in sound quality output from the speaker 2. In this regard, in the operating device 10, an elastic member 3 presses the speaker 2 against the edge 54 of the opening 53, so that the speaker 2 blocks the opening 53 and brings the storage chamber A into a closed state. This makes it possible to maintain a capacity of a space (air) of the storage chamber A at a preset size, allowing suppression of the change in sound quality output from the speaker 2.

As illustrated in FIGS. 2 to 4, the operating device 10 has the elastic member 3 for supporting the lower surface 2*b* of the speaker 2. The elastic member 3 is column-shaped, its upper surface is in contact with the lower surface 2*b* of the speaker 2, and its lower surface is in contact with a bottom member (e.g., circuit board 6 which will be described later) that defines a bottom surface. In the example of the operating device 10, the elastic member 3 is a block that includes an insulating material such as rubber or elastomer. The elastic member 3 is not limited thereto and may be a metallic spring. Also, the number of elastic members 3 that support the speaker 2 is not limited to one, and there may be a plurality of elastic members 3. The elastic member 3 is arranged at a position avoiding the terminal section P of the speaker 2 in the up-and-down direction (position that does not overlap the terminal section P) and presses the speaker 2 against the edge 54 of the opening 53.

As illustrated in FIGS. 3 and 4, the elastic member 3 is arranged at the center section of the speaker 2. In other words, the elastic member 3 intersects a centerline c-c that passes through a center of the speaker 2. In the example illustrated in FIGS. 3 and 4, the centerline passing through the center of the elastic member 3 matches the centerline c-c of the speaker 2. The centerline of the elastic member 3 is not limited thereto and may be misaligned in the direction away from the terminal section P relative to the centerline c-c of the speaker 2 (e.g., rightward in FIG. 3). Thus, the supporting of the lower surface 2*b* of the speaker 2 by the elastic member 3 at the centerline c-c improves stability of the supporting of the speaker 2.

Also, as illustrated in FIGS. 3 and 4, the width of the elastic member 3 in the direction (longitudinal or horizontal direction) orthogonal to the upward direction (first direction) is smaller than the width of the speaker 2 in the orthogonal direction in question. This makes it possible to reserve the capacity of the space inside the storage chamber A. As illustrated in FIG. 3, a width W1 of the elastic member 3 is smaller than the width W2 of the speaker 2 in the horizontal direction (long direction of the speaker 2). More specifically, the width W1 of the elastic member 3 is smaller than half the width W2 of the speaker 2 in the horizontal direction. Also, as illustrated in FIG. 4, a width W3 of the elastic member 3 is smaller than the width W4 of the speaker 2 in the longitudinal direction (short direction of the speaker 2). It should be noted that the width W3 of the elastic member 3 is larger than half the width W4 of the speaker 2 in the longitudinal direction. Also, a thickness H1 of the elastic member 3 in the up-and-down direction is larger than a thickness H2 of the speaker 2 in the up-and-down direction. Because the thickness H1 of the elastic member 3 corresponds to a height of the storage chamber A, it is possible to reserve the capacity of the space inside the storage chamber A by the thickness H1 of the elastic member 3 being secured.

Also, it is desirable that a ratio of a volume of the elastic member 3 (sum of the volumes of the plurality of elastic members 3 in a case where the elastic member 3 is provided in plural number) to the capacity of the storage chamber Abe set to 5% or more but 25% or less. In a case where the ratio is set to less than 5%, it becomes difficult to secure strength of the elastic member 3 for supporting the speaker 2. Also, in a case where the ratio is set to more than 25%, it becomes difficult to reserve the capacity of the space inside the storage chamber A. Accordingly, the setting of the ratio to an appropriate value allows not only supporting of the speaker 2 in the storage chamber A but also reservation of the capacity of the space inside the storage chamber A appropriate for acquiring an excellent sound quality from the speaker 2. In the example of the operating device 10, the ratio of the volume of the elastic member 3 to the capacity of the storage chamber A is set to 10% or more but 20% or less.

As illustrated in FIGS. 3 and 4, because the height of the storage chamber Ain the up-and-down direction is approximately the same as the thickness H1 of the elastic member and the storage chamber A and the elastic member 3 are approximately cuboid-shaped, the ratio of the volume of the elastic member 3 to the capacity of the storage chamber A is approximately the same as the ratio of an area (bottom area) of the elastic member 3 to the area (bottom area) of the storage chamber A in the longitudinal and horizontal directions. Accordingly, the ratio of the area of the elastic member 3 to the area of the storage chamber A in the longitudinal and horizontal directions may be set to 5% or more but 25% or less. In the example of the operating device 10, the ratio of the area of the elastic member 3 to the area of the storage chamber A is set to 10% or more but 20% or less.

Also, the area of the storage chamber A in the longitudinal and horizontal directions is approximately the same as the area of the lower surface 2*b* of the speaker 2. Accordingly, the ratio between the area of the lower surface 2*b* of the speaker 2 and the area of a contact portion between the speaker 2 and the elastic member 3 may be set to 5% or more but 25% or less. In the example of the operating device 10, the area of the lower surface 2*b* of the speaker 2 and the area of the contact portion are set to 10% or more but 20% or less.

[Arrangement of the Circuit Board]

As illustrated in FIG. 2, the operating device 10 has the circuit board 6 that is electrically connected to the speaker 2. As illustrated in FIGS. 3 and 4, the circuit board 6 defines the storage chamber A together with the wall section 52. The circuit board 6 is arranged on an opposite side of the opening 53 with the speaker 2 and the elastic member 3 therebetween and functions as a bottom member that defines the bottom surface of the storage chamber A. Thus, it is possible, by using the circuit board 6 as a bottom member included in the storage compartment A, to suppress an increase in the number of components as compared to the case where the bottom member includes a member other than the circuit board 6. Also, this makes an electrical connection structure between the speaker 2 and the circuit board 6 simpler. For example, it is possible to electrically connect the speaker 2 and the circuit board 6 by providing the terminal section P on the lower surface 2*b* of the speaker 2 and extending the terminal section Q upward from the circuit board 6.

It should be noted that, although part of the circuit board 6 defines the bottom surface of the storage chamber A in the example illustrated in FIG. 2, the present invention is not limited thereto, and the entire circuit board 6 may define the bottom surface of the storage chamber A. Also, the bottom member that defines the bottom surface of the storage chamber A is not limited to the circuit board 6 and may be any other member that is arranged on the opposite side of the speaker 2 with the elastic member 3 therebetween. The bottom member may also be an exterior member (lower cover section 40) of the operating device 10, a battery case 7 to be described later provided on the inner side of the lower cover section 40, or the like. Also, the storage chamber A may be formed by the frame 50. In this case, the bottom member may be formed integrally with the wall section 52 as part of the frame 50 or formed by the frame 50 alone, and the storage chamber A may be formed by the frame 50 alone.

As illustrated in FIGS. 3 and 4, the elastic member 3 is pressed by the upper surface 6*a* of the circuit board 6 which is the bottom member, and the speaker 2 is thus pressed against the edge 54 of the opening 53. This suppresses occurrence of a gap between the upper surface 2*a* of the speaker 2 and the edge 54 of the opening 53 and improves airtightness of the storage chamber A. As a result, it is possible to suppress the change in sound quality output from the speaker 2. Also, the circuit board 6 which is the bottom member may be attached, by a screw, for example, to the frame 50 which is the storage member having the wall section 52. This makes it less likely for a gap arising from tolerance to occur between the circuit board 6 and the wall section 52 and allows suppression of the change in sound quality output from the speaker 2. Also, the speaker 2 is supported by the elastic member 3, thus allowing a reduction in impacts of vibrations of vibrators (e.g., vibration motor 28 which will be described later) and vibrations of the frame 50 caused by button operations.

Also, as illustrated in FIGS. 3 and 4, a cushioning member 9 may be arranged between the wall section 52 and the circuit board 6 which is the bottom member of the storage chamber A. The cushioning member 9 includes an insulating material such as rubber or elastomer and blocks the gap between the wall section 52 and the circuit board 6. This makes it possible to further improve the airtightness of the storage chamber A and more effectively suppress the change in sound quality output from the speaker 2 than in a case where the cushioning member 9 is not provided.

As illustrated in FIGS. 3 and 4, the operating device 10 has the battery case 7 for storing a battery (not illustrated). The battery case 7 is stored inside the lower cover section 40 and located below the circuit board 6. Also, a second elastic member 4 is arranged between the lower cover section 40 and the battery case 7. The second elastic member 4 may include an insulating material such as rubber or elastomer as does the elastic member 3.

The second elastic member 4 is arranged on the opposite side of the speaker 2 with the circuit board 6 which is the bottom member of the storage chamber A therebetween and presses the circuit board 6 against the wall section 52. In the example illustrated in FIGS. 3 and 4, the second elastic member 4 is arranged below the circuit board 6. Also, the battery case 7 is arranged between the circuit board 6 and the second elastic member 4, and an upper end portion 7*a* of the battery case 7 is in contact with a lower surface 6*b* of the circuit board 6. The second elastic member 4 presses the lower end portion of the battery case 7 upward, so that the upper end portion 7*a* of the battery case 7 presses the circuit board 6. Thus, the pressing of the circuit board 6 from a lower side of the circuit board 6 in a direction in which the wall section 52 is located allows further improvement in the airtightness of the storage chamber A. This makes it possible to effectively suppress the change in sound quality output from the speaker 2. It should be noted that, although the second elastic member 4 presses the battery case 7 in the example of the operating device 10, the present invention is not limited thereto, and the second elastic member 4 may press any of the members (e.g., battery itself) that is arranged below the circuit board 6 or directly press the circuit board 6 by coming in contact with the circuit board 6.

[Arrangement of the Microphones]

As illustrated in FIG. 4, the operating device 10 has the two microphones 8A and 8B. The operating device 10 is not limited thereto and may have only one of the microphones 8A and 8B or three or more microphones. Also, the operating device 10 may even have no microphone.

As illustrated in FIG. 4, both of the two microphones 8A and 8B face the directions away from the speaker 2. This makes it less likely for the microphones 8A and 8B to pick up sounds output from the speaker 2. The first microphone 8A is arranged along the inner surface of the upper cover section 30 and faces the backward and upwardly diagonal direction in which the sound hole 32 is formed in the upper cover section 30. Similarly, the second microphone 8B is arranged along the inner surface of the lower cover section 40 and faces the backward and downwardly diagonal direction in which the sound hole 41 is formed in the lower cover section 40.

As illustrated in FIG. 4, the two microphones 8A and 8B are arranged in such a manner as to be at different distances from a mouth of the user holding the operating device 10. The first microphone 8A is arranged on an upper side of the circuit board 6, and the second microphone 8B is arranged on a lower side of the circuit board 6. Thus, the second microphone 8B is arranged on the opposite side of the speaker 2 with the circuit board 6 therebetween, which makes it less likely for sounds output from the speaker 2 to be transferred to the second microphone 8B.

As illustrated in FIG. 4, both of the two microphones 8A and 8B are supported by members different from the frame 50 which is the storage member for the speaker 2. For example, the first microphone 8A may be supported by an exterior member (e.g., upper cover section 30) of the operating device 10. Also, the second microphone 8B may be supported by an exterior member (e.g., lower cover section 40) of the operating device 10 or by the battery case 7. Thus, the supporting of the microphones 8A and 8B by the members different from the frame 50 that stores the speaker 2 allows suppression of transfer of vibrations, generated when sounds are output from the speaker 2, to the microphones 8A and 8B. That is, it is possible to suppress vibrations of the speaker 2 from affecting the sounds acquired by the microphones 8A and 8B.

Other Configurations

As illustrated in FIG. 4, the operating device 10 has a switch 29 that is supported by the frame 50. The button 26 described earlier that is provided in the exterior member (upper cover section 30) presses the switch 29. The switch 29 is located on an upper side (in the first direction) relative to the frame 50, and the elastic member 3 is located on a lower side (in the direction opposite to the first direction) relative to the frame 50. Also, other switches that are pressed by the input buttons 21 and 23 and the direction keys 22 illustrated in FIG. 1 may be provided on the frame 50.

The pressing of the switch 29 by the button 26 or other switches by the input buttons 21 and 23, the direction keys 22, or the like causes the frame 50 to vibrate. As described earlier, the elastic member 3 is arranged below the speaker 2 and presses the speaker 2 against the edge 54 of the opening 53 formed in the frame 50. Accordingly, it is possible to suppress detachment of the speaker 2 due to vibrations of the frame 50 by means of the elastic member 3.

As illustrated in FIG. 1, the operating device 10 has the vibration motors 28 inside the left and right held sections 10L and 10R. The vibration motors 28 are located in the respective grips 12 and are driven in response to an instruction from the information processing apparatus or the like, so that the grips 12 vibrate. It should be noted that the vibration motor 28L may be a linear motor (e.g., voice coil motor) or a rotary motor (e.g., direct current (DC) motor). Also, although the two vibration motors 28 are used in the example of the operating device 10, the number of vibration motors 28 may be one or three or more.

The vibration motors 28 are supported by the frame 50. As illustrated in FIG. 2, recessed portions 56 (motor storage sections) are formed on a rear side of the plate-shaped center section 51 of the frame 50, and the vibration motors 28 are stored therein. In the example of the operating device 10, the two recessed portions 56 corresponding to the shapes of the left and right held sections 10L and 10R are arranged inside the grips 11, and the two vibration motors 28 are stored in the two recessed portions 56, respectively. The vibration motors 28 vibrate, so that the frame 50 vibrates. Even if the frame 50 vibrates as described above, it is possible to suppress detachment of the speaker 2 from the frame 50 because the elastic member 3 presses the speaker 2 against the edge 54 of the opening 53 that is formed in the frame 50.

As illustrated in FIG. 4, the speaker 2 and the storage chamber A that stores the speaker 2 are misaligned forward relative to the sound holes 31 formed in the upper cover section 30, to reserve a region for arranging the switch 29 in the frame 50. Accordingly, the wall section 52 that defines the storage chamber A has an inclined portion 52*b* that extends in the backward and upwardly diagonal direction.

As illustrated in FIGS. 3 and 4, the upper end portion 52*a* of the wall section 52 is in contact with the inner surface of the upper cover section 30. This suppresses occurrence of gaps between the opening 53 formed in the upper end portion 52*a* of the wall section 52 and the plurality of sound holes 31 formed in the upper cover section 30, making it possible to suppress sounds output from the speaker 2 from being transferred to the components (e.g., microphones 8A and 8B) inside the operating device 10. As described earlier, the provision of the inclined portion 52*b* that extends in the backward and upwardly diagonal direction in the wall section 52 can maintain the upper end portion 52*a* of the wall section 52 (inclined portion 52*b*) to be in contact with the inner surface of the upper cover section 30 even in a case where the switch 29 is provided in the frame 50.

As described above, the operating device 10 has the elastic member 3 that supports the lower surface 2*b* of the speaker 2 and presses the speaker 2 against the edge 54 of the opening 53. This enables the speaker 2 to suppress occurrence of a gap with the edge 54 of the opening 53, making it possible to maintain the capacity of the space of the storage chamber A at a preset size. As a result, it is possible to suppress the change in sound quality output from the speaker 2.

The invention claimed is:

1. Electronic equipment comprising:

a speaker having a first surface that faces a first direction, a second surface that faces a second direction opposite to the first direction, and a terminal section;

a storage member having a wall section that defines at least part of a storage chamber that stores the speaker, wherein the wall section comprises an upper end portion covered by an upper cover section that is in contact with the upper end portion;

an opening that is formed in the upper end portion of the wall section, located in the first direction relative to the first surface of the speaker, and used to output sounds from the speaker;

a cushioning member arranged between the speaker and a bottom member, the cushioning member extending away from the speaker in the second direction, and the bottom member arranged to in the second direction from the speaker; and an elastic member that is adapted to support the second surface of the speaker, arranged at a position avoiding the terminal section of the speaker, and configured to press the speaker against an edge of the opening, wherein the elastic member is in contact with the bottom member.

2. The electronic equipment according to claim 1, wherein the elastic member intersects a centerline that passes through a center of the speaker.

3. The electronic equipment according to claim 1, wherein a width of the elastic member in a direction orthogonal to the first direction is smaller than a width of the speaker.

4. The electronic equipment according to claim 1, wherein a ratio of a volume of the elastic member to a capacity of the storage chamber is 5% or more but 25% or less.

5. The electronic equipment according to claim 1, wherein a thickness of the elastic member in the first direction is larger than a thickness of the speaker in the first direction.

6. The electronic equipment according to claim 1, wherein the storage chamber is defined by the wall section and the bottom member.

7. The electronic equipment according to claim 6, wherein the bottom member is at least part of a circuit board electrically connected to the speaker.

8. The electronic equipment according to claim 1, further comprising: a microphone, wherein the microphone faces a direction away from the speaker.

9. The electronic equipment according to claim 8, wherein the microphone is supported by a member different from the storage member.

10. The electronic equipment according to claim 1, further comprising: an exterior member adapted to store the speaker, wherein the storage member is a frame stored in the exterior member.

11. The electronic equipment according to claim 10, further comprising: a circuit board that is stored in the exterior member and electrically connected to the speaker, wherein the storage chamber is defined by the wall section included in the frame and at least part of the circuit board.

12. The electronic equipment according to claim 10, wherein the storage chamber is formed by the frame.

13. The electronic equipment according to claim 10, further comprising:

a switch supported by the frame, and a button that is provided in the exterior member and adapted to press the switch, wherein the switch is located in the first direction relative to the frame, and wherein the elastic member is located in a direction opposite to the first direction relative to the frame.

14. The electronic equipment according to claim 1, wherein the elastic member is configured to press the speaker against the edge of the opening to close a gap between an upper surface of the speaker and the edge of the opening.

15. The electronic equipment of claim 1, wherein the cushioning member comprises an insulating material configured to close a gap between the wall section and the bottom member.

16. The electronic equipment of claim 15, wherein the insulating material comprises at least one of rubber or elastomer.

17. Electric equipment comprising:

a speaker having a first surface that faces a first direction, a second surface that faces a second direction opposite to the first direction, and a terminal section;

a storage member having a wall section that defines at least part of a storage chamber that stores the speaker;

an opening that is formed in the wall section, located in the first direction relative to the first surface of the speaker, and used to output sounds from the speaker;

a cushioning member arranged between the speaker and a bottom member, the cushioning member extending away from the speaker in the second direction, and the bottom member arranged to in the second direction from the speaker; and a first elastic member that is adapted to support the second surface of the speaker, arranged at a position avoiding the terminal section of the speaker, and configured to press the speaker against an edge of the opening, wherein the elastic member is in contact with the bottom member; and a second elastic member that is arranged on an opposite side of the speaker with the bottom member therebetween and adapted to press the bottom member against the wall section, wherein the storage chamber is defined by the wall section and the bottom member.

* * * * *